(12) United States Patent
Twerdochlib (10) Patent No.: US 8,126,662 B2
(45) Date of Patent: Feb. 28, 2012

(54) METHOD AND APPARATUS FOR MONITORING BLADE VIBRATION WITH A FIBER OPTIC RIBBON PROBE

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 763 days.

(21) Appl. No.: 12/360,897

(22) Filed: Jan. 28, 2009

(65) Prior Publication Data

US 2010/0076703 A1    Mar. 25, 2010

Related U.S. Application Data (60) Provisional application No. 61/099,634, filed on Sep. 24, 2008.

(51) Int. Cl.
*G06F 11/00* (2006.01)
(52) U.S. Cl. ............................................ 702/56; 73/660
(58) Field of Classification Search ............ 702/56, 702/182–185, 188; 73/660, 593, 579, 655
See application file for complete search history.

(56) References Cited

U.S. PATENT DOCUMENTS

| | | | | |
|---|---|---|---|---|
| 4,373,804 | A | * | 2/1983 | Pryor et al. .................. 356/3.07 |
| 4,914,953 | A | * | 4/1990 | Viscovich ....................... 73/660 |
| 5,557,099 | A | | 9/1996 | Zielinski et al. |
| 6,037,581 | A | | 3/2000 | Zorner |
| 6,587,207 | B2 | | 7/2003 | Hessert et al. |
| 6,678,060 | B2 | | 1/2004 | Heyworth |
| 7,341,428 | B2 | | 3/2008 | Twerdochlib |
| 7,734,435 | B2 | * | 6/2010 | Thomas et al. .................. 702/70 |
| 2010/0074572 | A1 | * | 3/2010 | Zheng et al. .................... 385/13 |
| 2010/0211343 | A1 | * | 8/2010 | Thomas et al. .................. 702/70 |

FOREIGN PATENT DOCUMENTS

| | | |
|---|---|---|
| DE | 4344650 C1 | 1/1995 |
| EP | 0586288 A1 | 3/1994 |
| JP | 05164602 A | 6/1993 |

OTHER PUBLICATIONS

Method and Apparatus for Monitoring Blade Vibration With an Imaging Fiber Optic Ribbon Probe.
Henry Jones, "Shedding light on vibration"; Mechanical Engineering, Nov. 1, 1996; pp. 94-97; XP000643790.

* cited by examiner

*Primary Examiner* — Edward Raymond (57) ABSTRACT

A method and apparatus for monitoring blade vibrations in a turbine engine having blade tip target portions associated with blades. An illumination conduit including a plurality of optical fibers conveys light from a light source to a transmission end of the optical fibers where the light is focused to define an axially elongated projected image. The blade tip target portions pass through the projected image and reflect light to receptor ends of a plurality of optical fibers defining a detection conduit for conveying the reflected light to a processor. The transmission ends and receptor ends of the optical fibers are configured as a narrow rectangle to define a probe end for receiving reflected light at different axial locations along the probe end, and to detect blade passing events defined by passage of either or both a blade leading edge and a blade trailing edge.

20 Claims, 4 Drawing Sheets

METHOD AND APPARATUS FOR MONITORING BLADE VIBRATION WITH A FIBER OPTIC RIBBON PROBE

CROSS-REFERENCE TO RELATED APPLICATIONS

This application claims the benefit of U.S. Provisional Application No. 61/099,634 entitled A BLADE VIBRATION MONITOR FIBER OPTIC RIBBON PROBE, filed Sep. 24, 2008, the entire disclosure of which is incorporated herein by reference.

FIELD OF THE INVENTION

The present invention is related to turbine blade vibration monitoring and, more particularly, to a fiber optic ribbon probe for use in detecting blade passing events during blade vibration monitoring.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

The measured vibration amplitude is highly dependent on correct positioning of the sensor above the blade target, which may comprise a target affixed to the blade, a feature of the blade, or the blade tip itself. In a typical measurement, the probes may be positioned to sense the passage of a leading edge or trailing edge of the blades.

In one known system of obtaining time-of-arrival data from rotating blades, a five lens laser line probe spreads a laser light into a line that spans a portion of the blade tip to be certain that either the leading blade tip edge or trailing blade tip edge is detected as the time-of-arrival. A pulse of light is produced by the laser light reflected from the tip edge as it passes the probe, and is received by the probe. If the probe is positioned over the leading edge, a leading pulse edge indicates the arrival of the leading blade tip edge, providing a vibration measurement at the leading tip edge. If the probe is positioned over the trailing blade tip edge, a falling pulse edge indicates the leaving trailing blade tip edge, providing a vibration measurement at the trailing tip edge. Such a measurement requires that the line of laser light overhang the leading or trailing edge to ensure that the leading or trailing edge is intercepted, and additionally requires that the probe for receiving the reflected light be accurately located to ensure that the focal point for the probe is located at or near the leading or trailing edge of the blade in that a "missed edge" condition will not be detected by this probe configuration The difficulty in properly aligning a probe is increased by axial movements of the blades during operation, such as may occur as the rotor spins up or down, as the turbine warms up and cools down, as the load on the turbine changes, and due to torsional movements of the blades. Accordingly, it is desirable to provide a BVM probe that is capable of providing time-of-arrival data substantially unaffected by axial movements of the blades.

SUMMARY OF THE INVENTION

In accordance with one aspect of the invention, a blade vibration monitor is provided for monitoring blade vibration in a turbine engine including a blade structure comprising a plurality of blades and blade tip target portions associated with the blades, and a casing surrounding the blade structure. The blade vibration monitor comprises a light source and a first illumination conduit having a transmission end for locating adjacent to an interior portion of the casing for projecting an image comprising light energy from the light source onto the blade structure in the turbine. The projected image comprises an axially elongated projected image. A processor is provided for processing reflected light images from the blade tip target portions corresponding to a blade passing event. A detection conduit is provided having a receptor end for locating adjacent an interior portion of the casing for receiving the reflected light images from the blade tip target portions and for conveying the reflected light images to the processor. The receptor end of the detection conduit receives reflected light images from a plurality of locations along the axially elongated projected image during a blade passing event.

In accordance with another aspect of the invention, a blade vibration monitor is provided for monitoring blade vibration in a turbine engine including a blade structure comprising a plurality of blades and blade tip target portions associated with the blades, and a casing surrounding the blade structure. The blade vibration monitor comprises a light source and first and second illumination conduits each comprising a plurality of optical fibers arranged in a linear array and defining respective first and second transmission ends for locating adjacent to an interior portion of the casing for projecting an image of the light source onto the blade structure in the turbine. The projected image comprises an axially elongated projected image. A processor is provided for processing reflected light images from a blade tip target portion corresponding to a blade passing event. A detection conduit is provided comprising a plurality of optical fibers arranged in a linear array and defining a receptor end. The detection conduit is configured to convey the reflected light images to the processor, and is located adjacent to the transmission ends of the illumination conduits for receiving reflected light images from a plurality of locations along the axially elongated projected image during a blade passing event.

In accordance with a further aspect of the invention, a method of monitoring blade vibrations in a turbine engine is provided. The turbine engine includes a blade structure comprising a plurality of blades and blade tip target portions associated with the blades, and a casing surrounding the blade structure. The method of monitoring blade vibrations comprises: emitting a line of light defining an axially elongated projected image from a plurality of illumination optical fibers; passing the blade tip target portions along a path of travel through locations corresponding to the axially elongated projected image and forming reflected light images at locations on the blade tip target portions to define blade passing events; and receiving the reflected light images at a receptor end of a detection conduit defined by a plurality of receptor optical fibers, the reflected light corresponding to a plurality of locations along the axially elongated projected image as each blade tip target portion moves past the line of light.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
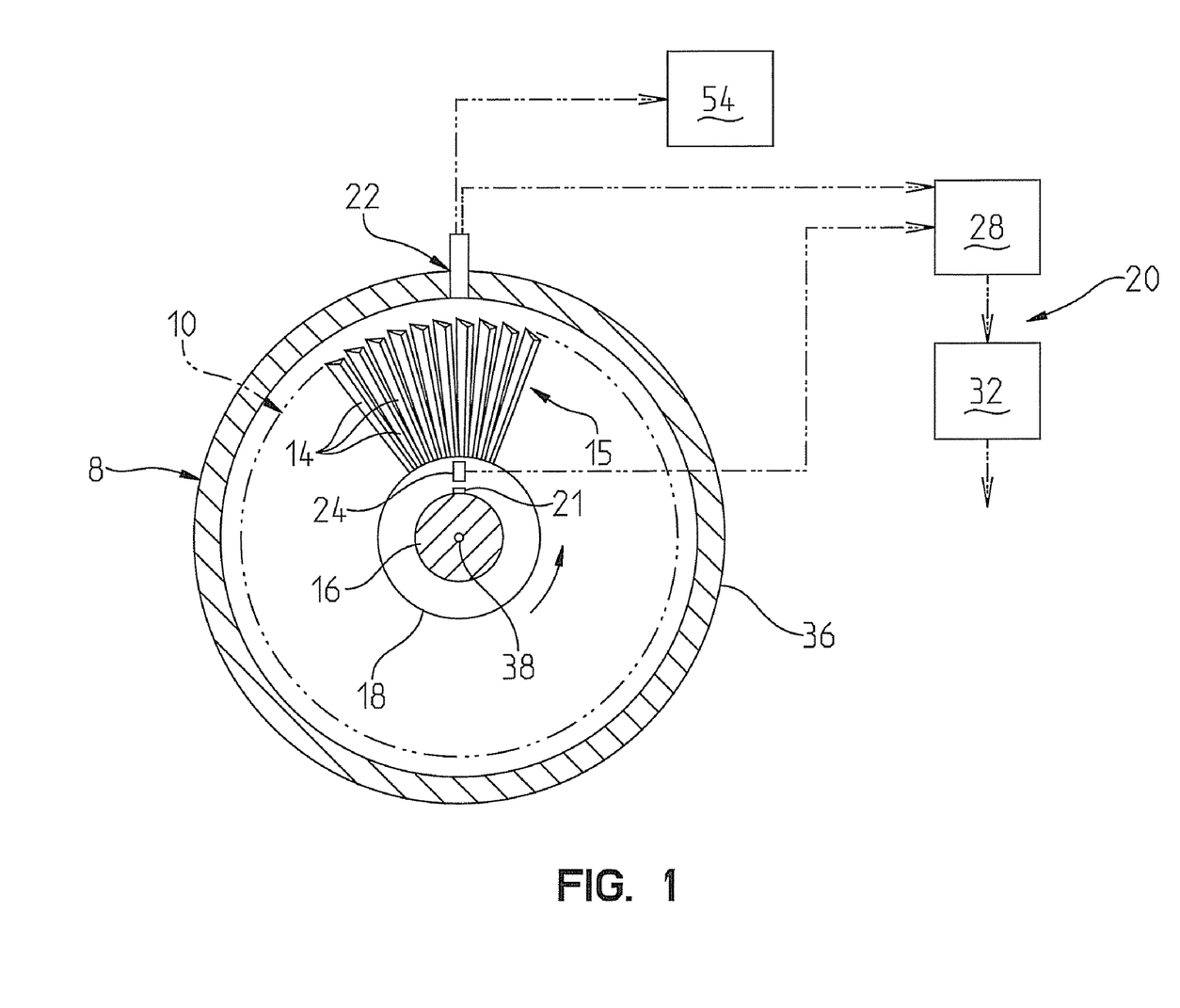
FIG. 1 is a diagrammatic view illustrating a turbine and a blade vibration monitor system incorporating the present invention.

FIG. 1 diagrammatically illustrates a turbine 8 including an unshrouded blade row 10 in which the method and apparatus of the present invention may be employed in a blade vibration monitoring system to monitor vibrations of turbine blades 14. The turbine blades 14 are connected to a rotor 16 by means of a rotor disk 18 and form a blade structure 15 within the turbine 8.

A turbine blade vibration monitoring system (BVM) 20 is also shown in FIG. 1. The system 20 includes a turbine blade probe 22 mounted to a casing 36 of the turbine 8 for monitoring the vibration of the turbine blades 14. It should be understood that although only one probe 22 is described herein with reference to the present invention, plural probes 22 may be provided in circumferentially spaced relation to each other.

As is further illustrated in FIG. 1, a reference sensor 24 is additionally provided. The reference sensor 24, in conjunction with an indicia 21 on the rotor 16, is operable to provide a once-per-revolution (OPR) reference pulse signal. Signals from the probe 22 and the signals from the reference sensor 24 are provided as inputs to a blade vibration processor 28. The output of the blade vibration processor 28 is input to a signal analyzer 32 which may perform signal conditioning and analysis.

Figure 2:
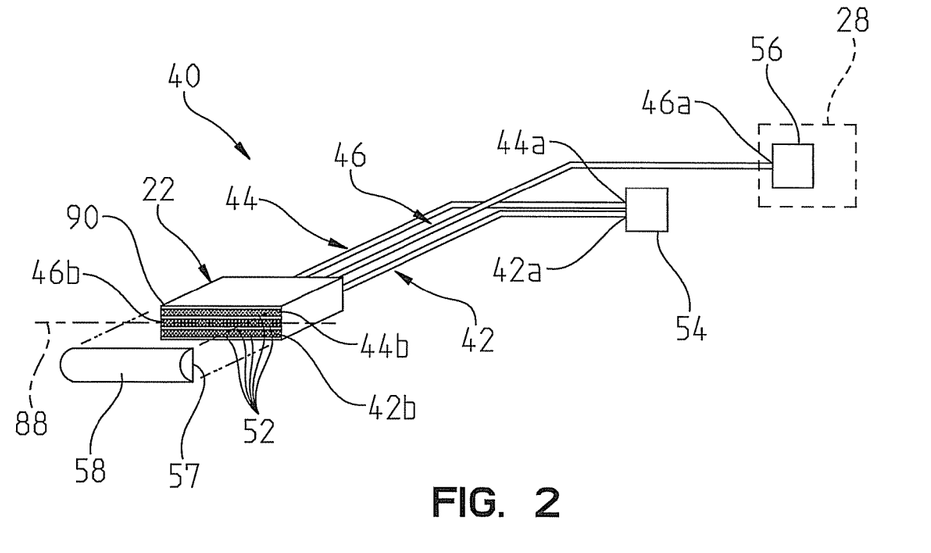
FIG. 2 is a partially exploded perspective view of a fiber optic ribbon probe constructed in accordance with the present invention.

Referring to FIG. 2, the probe 22 is a component of a fiber optic ribbon probe (FORP) 40 including a first illumination conduit 42, a second illumination conduit 44, and a detection conduit 46. The first and second illumination conduits 42, 44 and the detection conduit 46 are each formed of a plurality or bundle of optical fibers 52. Each bundle of optical fibers 52 is formed into a fiber optic ribbon for incorporation in the probe 22, as will be described further below.

The BVM 20 further includes an illumination or light source 54 which, in the preferred embodiment, may comprise a laser light source. For example, a continuous laser light source, or a chopped (on/off) laser light source may be provided. A chopped laser light source, operated at a high fixed frequency may provide a frequency/phase sensitive detection of reflected light pulses received by the probe 22, as well as provide a substantial reduction in signal noise.

The first and second illumination conduits 42, 44 comprise respective illuminated ends 42a, 44a located at the light source 54 for receiving light energy to be conducted though the illumination conduits 42, 44. The opposite ends of the illumination conduits 42, 44 comprise fiber optic ribbon transmission ends 42b, 44b for locating adjacent to an interior portion of the casing 36 and projecting light toward the blades 14 during a BVM process as the blades 14 rotate about a rotational axis 38 of the rotor 16.

Similarly, the detection conduit 46 includes opposing ends comprising a radiating end 46a located adjacent a detector 56, and a fiber optic ribbon receptor end 46b for locating adjacent to the interior portion of the casing 36 and receiving reflected light during blade passing events as the blades 14 rotate past the probe 22. As illustrated herein, the detector 56 comprises a component of the processor 28, and may produce a voltage output corresponding to, e.g., proportional to, detected light signals conveyed through the detection conduit 46 from the receptor end 46b to the radiating end 46a in response to blade passing events.

Figure 3:
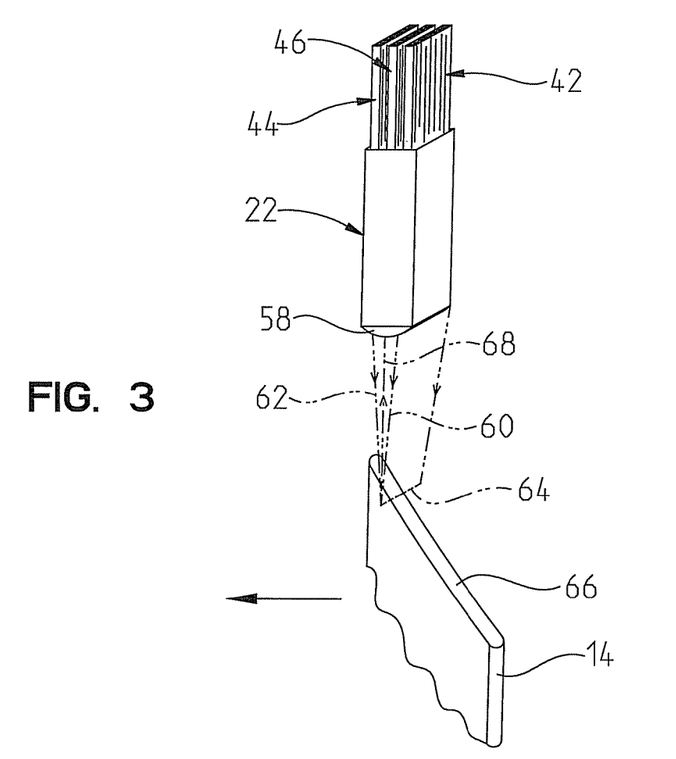
FIG. 3 is a perspective view of a sensing end of the fiber optic ribbon probe of FIG. 2.

FIG. 3 further illustrates the probe 22 in relation to a blade 14 (shown diagrammatically). The probe 22 includes a very small cylindrical lens 58 that is attached to the transmission ends 42b, 44b of the illumination conduits 42, 44 and to the receptor end 46b of the detection conduit 46. The cylindrical lens 58 focuses the light conveyed from the light source 54 through the illumination conduits 42, 44, and emitted from the transmission ends 42b, 44b, as converging lines of light 60, 62 defining an axially elongated projected image, as depicted at 64 in FIG. 3. The elongated projected image 64 is focused to a location in space coinciding with a location though which a blade tip target portion 66 for each rotating blade 14 passes during rotating movement of the rotor 16. The location of the elongated projected image 64 also comprises a focal line for the center of the lens 58, and light reflected from the target portion 66 forms a reflected light image 68 that is focused by the cylindrical lens 58 onto the receptor end 46b of the detection conduit 46.

It should be noted that the blade tip target portion 66 of the illustrated embodiment comprises the blade surface defined by the radially outer tip of each of the blades 14. However, the target portions may comprise separately formed members (not shown) that may be attached at the outer circumference of the blade structure 15, and which are capable of providing a reflected light signal, indicating passage of the target portions past the probe 22.

Figures 4, 5, 6:
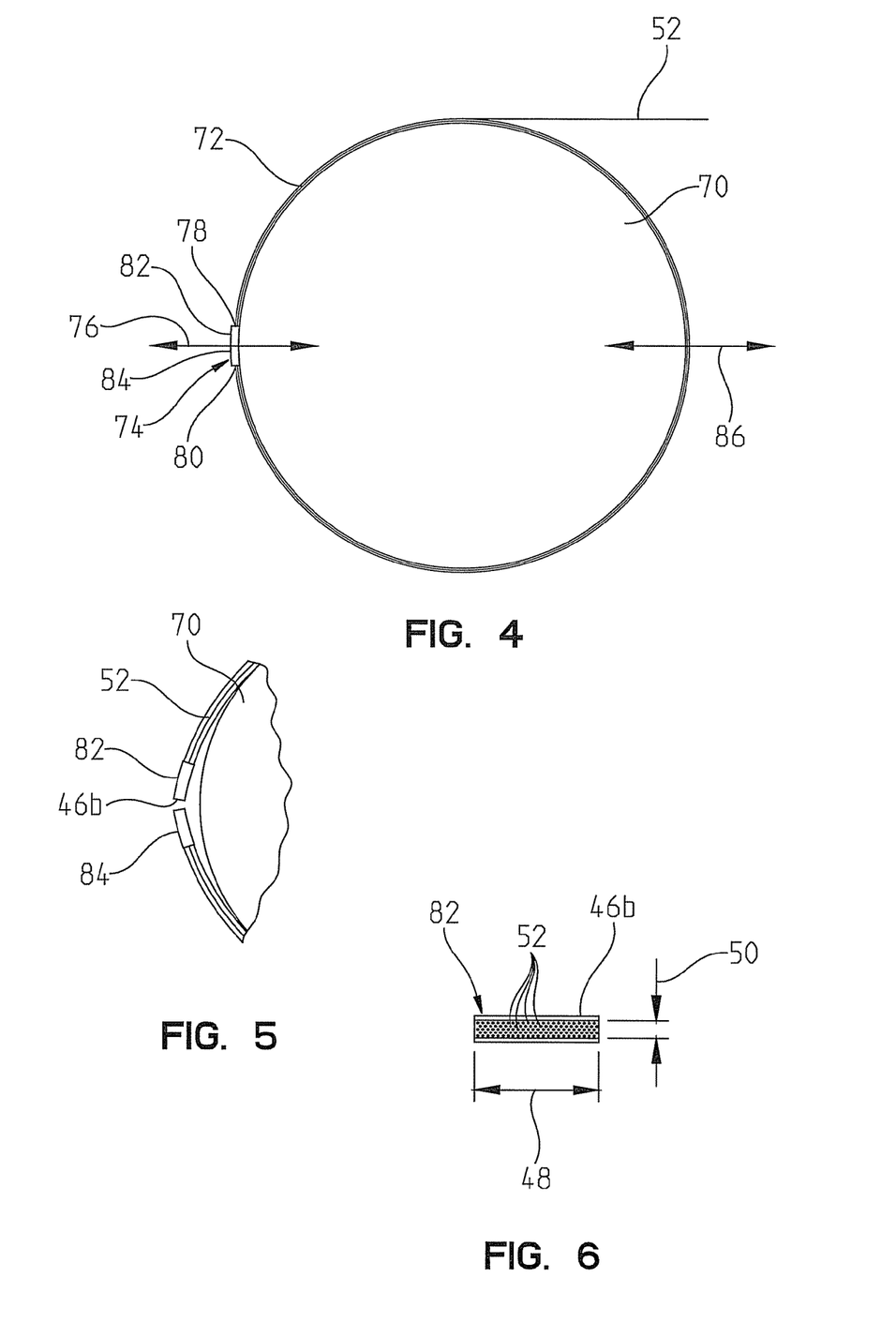
FIG. 4 is diagrammatic view illustrating construction of the fiber optic ribbon probe.
FIG. 5 is an enlarged diagrammatic view of the construction of the fiber optic ribbon probe illustrating severed ends formed by severing a bonded section of optical fiber windings.
FIG. 6 is an end view of a severed end of the bonded section for the fiber optic ribbon probe.

Referring to FIG. 4, a construction method for use in forming the conduits 42, 44, 46 for the FORP 40 is illustrated. For purposes of this description, the construction of only the detection conduit 46 and its associated receptor ribbon end 46b is described in detail. The detection conduit 46 is formed around a support structure 70 which is illustrated as a drum-like structure, but may comprise any circuitous structure for supporting multiple windings of optical fibers 52. A strand of hair-like optical fiber 52, e.g., an optical fiber 52 having a diameter of approximately 125 µm, is continuously wound about the support structure 70, with the windings of optical fibers 52 located in close contact with each other. The optical fiber 52 is wound to form a ribbon-like structure 72 extending around the support structure 70. A predetermined length of the plurality of windings forming the ribbon-like structure 72 is cemented together to define a bonded or adhered section 74 of the optical fibers 52.

Subsequent to formation of the adhered section 74 of the optical fibers 52, the adhered section 74 is severed transverse to the length of the optical fibers 52, i.e., transverse to the direction of elongation of the optical fibers 52, at a location intermediate the ends 78, 80 of the adhered section 74, as depicted by arrow 76. Preferably, the adhered section 74 is severed at a mid-way point between the ends 78, 80 of the section 74 to form two bonded fiber optic ribbons 82, 84, as seen in FIG. 5. The severed surfaces of the bonded fiber optic ribbons 82, 84 are polished to provide optically transmissive surfaces, where the polished surface of the bonded fiber optic ribbon 82 defines the receptor end 46b of the detection conduit 46. By way of example, the bonded fiber optic ribbon 82 may be configured as a narrow rectangular optical array having a length or major dimension 48 of approximately 0.750 inch (1.905 cm) and a thickness or minor dimension 50 of approximately 0.062 inch (0.157 cm).

The wound ribbon-like structure 72 is severed at a further location, such as at a location along the ribbon-like structure 72 mid-way between the bonded fiber optic ribbons 82, 84, as depicted by arrow 86 in FIG. 4. The portion of the wound optical fibers 52 associated with the bonded fiber optic ribbon 82 forms the detection conduit 46. The non-bonded severed ends of the optical fibers 52 formed at the severing location 86 may be gathered together to define the radiating end 46a of the detection conduit 46. For example, the non-bonded severed ends may be gathered to form a circular shape to define the radiating end 46a for radiating light onto a light sensitive surface of the detector 56 for conversion into electrical signals corresponding to the level of the light energy received through the bundle of optical fibers 52 forming the detection conduit 46. It should be noted that the radiating end 46a is not limited to any particular shape, and may be formed into any shape that facilitates coupling of the light passing from the receptor end 46b to the detector 56.

The portion of the wound optical fibers 52 associated with the remaining bonded fiber optic ribbon 84 may be used to form another probe conduit, such as one of the illumination conduits 42, 44, where the end of the bonded fiber optic ribbon 84 is polished and defines one of the transmission ends 42b, 44b. An additional wound ribbon-like structure 72 may be constructed as described above to form the remaining one of the illumination conduits 42, 44. The non-bonded ends of the optical fibers forming the illumination conduits 42, 44 are preferably gathered to form a circular shape to define the illuminated ends 42a, 44a for positioning at the light source 54 to convey light to the transmission ends 42b, 44b.

In an alternative construction of the present invention, one or more of the conduits 42, 44, 46 may be formed by leaving the ribbon-like structure 72 uncut at the location 86, such that the two bonded fiber optic ribbons 82, 84 define the opposing ends of any one of the conduits 42, 44 and/or 46. This construction of the conduits 42, 44, 46 may be formed in the same manner as the conduit construction described in patent application U.S. Ser. No. 12/360,909 entitled METHOD AND APPARATUS FOR MONITORING BLADE VIBRATION WITH AN IMAGING FIBER OPTIC RIBBON PROBE, the entire disclosure of which is incorporated herein by reference. It should be noted that this alternative construction may provide advantages in constructing and handling the ends of the present conduits 42, 44, 46.

It should be understood that the conduits 42, 44, 46 forming the FORP 40 are preferably formed as substantially identical members, i.e., having the same construction and dimensions. The probe 22 is formed by positioning the receptor end 46b in sandwiched relation between the transmission ends 42a, 44a, as may be seen in FIG. 2. The transmission ends 42b, 44b are preferably adhered or bonded onto either side of the receptor end 46b to configure the probe 22 as a narrow rectangle having a major axis 88. Additionally, a casing 90 (FIG. 2) may be provided surrounding the sides of the transmission ends 42b, 44b and the receptor end 46b to define an outer surface for the probe 22.

A flat face 57 of the cylindrical lens 58 is bonded directly to the polished transmission and receptor end surfaces 42b, 44b and 46b. The cylindrical lens 58 is configured as a narrow rectangle to substantially match the combined dimensions of the end surfaces 42b, 44b, 46b. For example, the cylindrical lens 58 may have a major dimension of approximately 0.750 inch (1.905 cm) and a minor dimension of approximately 0.200 inch (0.508 cm). Hence, the outer lengthwise edge portions of the cylindrical lens 58 are positioned over the transmission ends 42b, 44b to focus transmitted light from the optical fibers 52 of the illumination conduits 42, 44 at a predetermined angle inwardly to the location 64 of the axially elongated projected image 64, and the central portion of the cylindrical lens 58 is positioned over the receptor end 46b to focus light from the location 64 into the optical fibers 52 of the detection conduit 46.

In an alternative configuration of the probe 22, only one illumination conduit 42 or 44 may be provided having one of the transmission ends 42b or 44b in side-by-side relation with the receptor end 46b of the detection conduit 46.

As a further alternative construction of the probe 22, the ends of the optical fibers 52 forming the receptor end 46b and the transmission ends 42b, 44b may be intermingled across the thickness and along the major axis 88 of the probe 22. For example, the probe 22 may comprise one of the fiber optic ribbons 82, 84, formed as described with reference to FIGS. 4 and 5, where the illumination conduits 42, 44 and the detection conduit 46 are formed by apportioning selected optical fibers 52 of the ribbon-like structure 72 for each of the conduits 42, 44 and 46. The optical fibers 52 at the end opposite the probe 22 are preferably formed into a bifurcated bundle comprising two or more branches which, for the present embodiment, comprises branches for the light source 54 and the detector 56.

The selection of the optical fibers 52 for each of the illumination conduits 42, 44 and the detection conduit 46 may be random, or the particular optical fibers 52 selected to define each conduit 42, 44 and 46 may be selected according to an ordered pattern, such as to ensure a relatively even distribution of the optical fibers 52 defining the transmission ends 42b, 44b and receptor end 46b along the length of the probe 22. For example, every third winding of the optical fiber 52 may be segregated to each of the light paths defined by the conduits 42, 44 and 46, keeping each of these three segregated bundles separate at the location 86. In this configuration, it may be desirable to increase the thickness 50 of the ribbon-like structure 72 to permit a sufficient number of optical fibers 52 to be apportioned to each of the conduits 42, 44 and 46. While the present embodiment is described as providing an equal fiber count to the three conduits 42, 44, 46, specific applications of the probe 22 may be optimized by providing a different count configuration to any of the conduits 42, 44, 46. In each of the described alternative configurations, a cylindrical lens 58 may be attached to the polished ends of the optical fibers 52 to focus light to and from the location of the axially elongated projected image 64.

Figure 7:
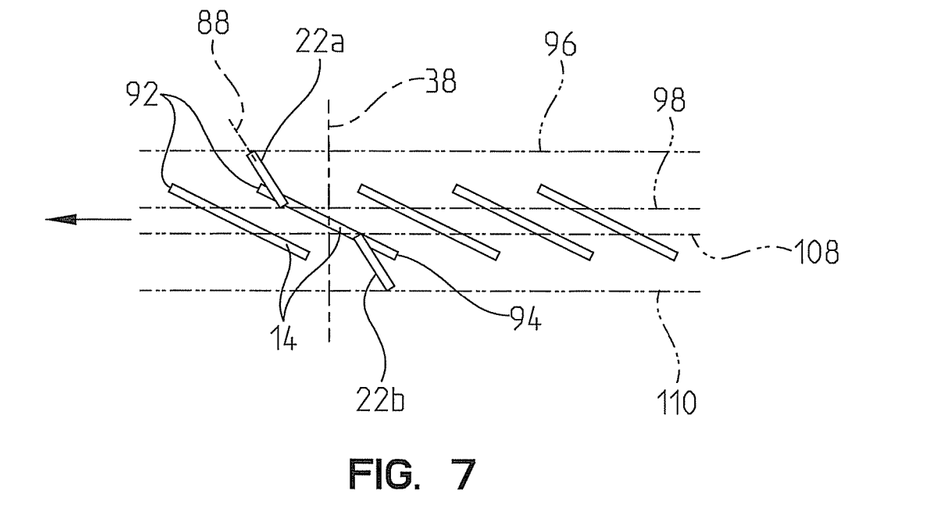
FIG. 7 is a diagrammatic plan view illustrating detection of blade passing events using the fiber optic ribbon probe.

Referring to FIG. 7, a method of using the FORP 40 to provide signals to the BVM 20 includes locating the probe 22 over at least one of the leading edge 92 of the blade 14, as indicated by a leading edge probe 22a, or over the trailing edge 94 of the blade 14, as indicated by a trailing edge probe 22b. Initially considering operation of the leading edge probe 22a to provide a signal indicative of a blade passing event, the probe 22a is positioned such that its major axis 88 extends in a generally axial direction relative to the rotational axis 38. In particular, the orientation of the probe 22a is such that it extends in an axial direction transverse to the target portion 66. The position of the probe 22a is selected such that the axial area spanned by the probe 22a, as represented by the area bounded between a first boundary line 96 and a second boundary line 98, overlaps the leading edge 92 of the blade 14 throughout the range of axial movement of the blade 14 during the various operating conditions of the turbine 8.

Figure 8:
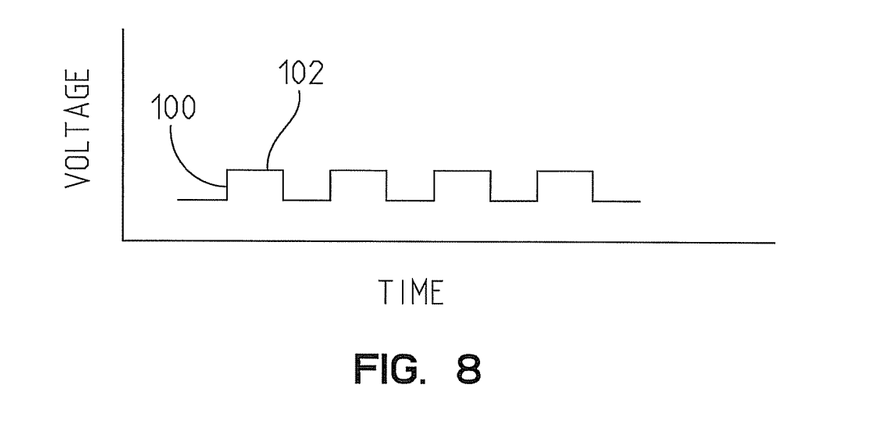
FIG. 8 is a graph illustrating signals produced by leading edge blade passing events.

As the blade 14 rotates and the leading edge 92 passes under the probe 22a, the blade tip target portion 66 intersects the line of light comprising the projected image 64 from the transmission ends 42b, 44b and reflects the light to the receptor end 46b. Referring to FIG. 8, a ramp-up 100 in the voltage at the detector 56 indicates arrival of the leading edge 92, and the voltage remains at a "high" state 102 as long as light is reflected from the target portion 66. The ramp-up 100 of each blade leading edge 92 is used as the triggering point for time-of-arrival calculations performed by the BVM 20 to identify and analyze blade vibrations. It should be noted that the optical fibers 52 forming the receptor end 46b are capable of receiving reflected light from a plurality of continuously varying locations along the projected image 64 from the time that the blade leading edge 92 intersects the projected image 64 until the blade tip target portion 66 passes out of the projected image 64. That is, different groups of the optical fibers 52 forming the receptor end 46b will progressively send a light signal to the detector 56 once the leading edge 92 intersects the projected image 64. The ramp-up 100 detected anywhere along the probe 22a at the initiation of the reflected light signal for each blade passing event may be used as a predetermined, repeatable location on the blade 14 (i.e., at the leading edge 92) for providing BVM data during multiple rotations of the rotor 16 regardless of axial displacements of the rotor 16 and/or blades 14.

Figure 9:
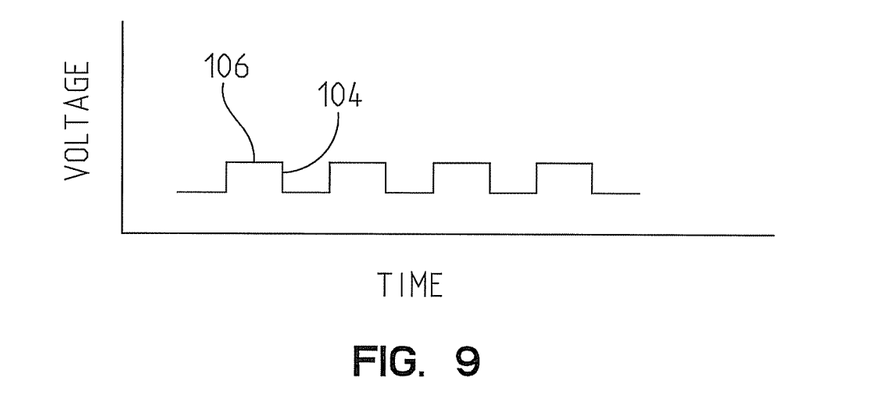
FIG. 9 is a graph illustrating signals produced by trailing edge blade passing events.

As an alternative, or in addition to the leading edge probe 22a, the trailing edge probe 22b may be used to detect a blade passing event in a manner similar to that described for the leading edge probe 22a. In particular, the time at which the trailing edge 94 passes the projected image 64 of the trailing edge probe 22b may be determined by a ramp-down 104 from a "high" state 106 of the voltage at the detector 56, as illustrated in FIG. 9. This ramp-down signal 104 may used to identify a blade passing event for each blade 14. The trailing edge probe 22b is axially positioned such that it may cover a range of axial movement of the blade trailing edge 94 in an area between a first boundary line 108 and a second boundary line 110 defined by the trailing edge probe 22b.

It should be noted that the same detector 56 may be used for identifying the signals from both the probes 22a, 22b. The signal provided from the leading edge detector 22a may be distinguished from the signal provided by the trailing edge probe 22b based on identified patterns in the voltage produced by the incoming light signals. In particular, in the configuration illustrated in FIG. 7, there are four "triggers" that are created with each blade passing event, where a "trigger" comprises an increase or decrease in the voltage output from the detector 56. For example, as the leading edge 92 of the blade 14 passes the leading edge probe 22a, the detector voltage will rise to the level 102 shown in FIG. 8 until the blade 14 also passes under the trailing edge probe 22b, causing the voltage to increase to a level approximately twice as great as 102. Then, as the blade 14 passes out from under the leading edge probe 22a, the voltage will decrease to the level 102, and the voltage will subsequently decrease further to the lowest state as the trailing 94 passes out from under the trailing edge probe 22b. The BVM 20 identifies this pattern of increasing and decreasing voltage signals, and rejects or drops the decreasing signal associated with the blade 14 passing out from under the leading edge probe 22a, and rejects the increasing voltage signal associated with the blade 14 passing under the trailing edge probe 22b. The remaining signals for the BVM analysis comprise the signal produced when the leading edge 92 passes under the leading edge probe 22a, and the trailing edge signal produced as the trailing edge 94 passes out from under the trailing edge probe 22b.

In an alternative configuration of the two probes 22a and 22b, the probes 22a, 22b may be positioned such that the first boundary line 108 of the trailing edge probe 22b is located above the second boundary line 98 of the leading edge probe 22a, such as by moving the leading edge probe 22a in a direction parallel to the rotational axis 38 toward the trailing edge probe 22b. In this configuration, the probes 22a, 22b will produce a long pulse with a single, higher spike (approximately twice the voltage 102) at the center with each blade passing event. The BVM 20 may be set to trigger on the first, lower amplitude voltage increase, indicating the leading edge passing, and on the last, lower amplitude voltage decrease, indicating the trailing edge passing. The triggering events associated with the central spike are rejected as non-triggering events in this configuration.

As an alternative to providing separate leading edge and trailing edge probes 22a, 22b, a single probe 22 having an axial length sufficient to span beyond both the lead edge 92 and trailing edge 94 of the blade 14 may be provided. The blade leading edge 92 may be detected by a ramp-up signal and the blade trailing edge 94 may be detected by a ramp-down signal. The blades 14 are typically canted at a steep angle in the direction of rotation, such that more than one blade 14 may reflect the projected image 64 during various portions of the blades' rotation past the probe 22. The signals for individual blades 14 may be distinguished from each other based on identification of the varying voltage signal, where two detected blades will provide approximately twice the amount of light through the optical fibers 52 of the detection conduit 46, resulting in approximately twice the voltage output at the detector 56. Further, the leading edge signals (ramp-up) and trailing edge signals (ramp-down), and the known geometry (angular orientation) of the probe 22 and the blades 14 within the turbine 8 provide additional information for characterizing the particular blade passing events. As with the two configurations described above, the pattern of triggering signals may be analyzed by the BVM 20, based on the known sensing configuration, to identify the leading edge and trailing edge trigger signals corresponding to each blade passing event.

In an application of the invention, incorporating both the leading edge probe 22a and the trailing edge probe 22b or a single probe 22 spanning both the leading edge 92 and the trailing edge 94, each blade passing event may be characterized by data comprising time-of-arrival of each of the leading edge 92 and trailing edge 94 of the blade 14. Data on the time-of-arrival of the leading edge 92 and trailing edge 94 for each of the blades 14 may be used to determine a torsional vibration mode of the blades 14. In particular, the torsional vibration mode (twist of the blade tip) of each blade 14 may be determined based on the difference between the times-of-arrival for the leading edge 92 and the trailing edge 94 for each blade 14 at each blade passing event, and as recorded during multiple revolutions of the blade 14, in combination with the known length of the target portion 66 (i.e., the length of the blade tip).

Application of the probe 22 to determine blade torsional mode vibration provides an advantage over prior or known "single spot" probe systems in that such prior probe systems typically do not provide information on the location of the blade twist axis. It is generally necessary to know the location of a spot probe along a blade tip, as well as know the location of the center of the blade twist axis on the blade tip, in order to make a torsional measurement. Also, the typical spot probe measurement cannot provide a blade twist measurement if the sensor spot is located at the blade center of twist. In contrast, the present probe 22 provides a known measurement location at both the leading edge 92 and the trailing edge 94, without requiring knowledge of the blade center of twist. The present measurement provides a determination of relative movement between the two edges 92, 94 and provides an identification of the location and angular orientation of the entire target portion 66 (blade tip) at each blade passing event. Further, the time-of-arrival data for both the leading edge 92 and the trailing edge 94 may be used to identify the lengthwise vibrations of the blade 14 at these locations and to distinguish these vibrations from the torsional mode vibrations.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. In a turbine engine including a blade structure comprising a plurality of blades and blade tip target portions associated with the blades, and a casing surrounding the blade structure, a blade vibration monitor for monitoring blade vibration comprising:
   a light source;
   a first illumination conduit having a transmission end for locating adjacent to an interior portion of the casing for projecting an image comprising light energy from the light source onto the blade structure in the turbine, the projected image comprising an axially elongated projected image;
   a processor for processing reflected light images from the blade tip target portions corresponding to a blade passing event; and
   a detection conduit having a receptor end for locating adjacent an interior portion of the casing for receiving reflected light images from the blade tip target portions and for conveying the reflected light images to the processor, the receptor end of the detection conduit receiving reflected light images from a plurality of locations along the axially elongated projected image during a blade passing event.

2. The blade vibration monitor as in claim 1, wherein the detection conduit comprises a plurality of optical fibers.

3. The blade vibration monitor as in claim 2, wherein the receptor end of the detection conduit is configured as a narrow rectangle defined by the plurality of optical fibers.

4. The blade vibration monitor as in claim 3, wherein the transmission end of the first illumination conduit comprises a plurality of optical fibers configured as a narrow rectangle and positioned adjacent to a side of the receptor end of the detection conduit.

5. The blade vibration monitor as in claim 4, including a cylindrical lens for focusing light from the transmission end of the first illumination conduit onto the blade tip target portion of a blade and for focusing light from the blade tip target portion onto the receptor end of the detection conduit.

6. The blade vibration monitor as in claim 4, including a second illumination conduit comprising a plurality of optical fibers defining a receptor end formed in substantially the same configuration as the first illumination conduit, wherein the receptor end of the detection conduit is located sandwiched between the transmission ends of the illumination conduits.

7. The blade vibration monitor as in claim 1, wherein the illumination conduit and detection conduit each comprise a plurality of optical fibers, and the transmission end and receptor end comprise ends of the optical fibers intermingled with each other and configured as a narrow rectangle.

8. The blade vibration monitor as in claim 1, wherein the processor is effective to detect variations in light energy transmitted through the detection conduit and corresponding to a blade passing event comprising passage of either a leading edge or a trailing edge of a blade through the axially elongated projected image.

9. In a turbine engine including a blade structure comprising a plurality of blades and blade tip target portions associated with the blades, and a casing surrounding the blade structure, a blade vibration monitor for monitoring blade vibration comprising:
   a light source;
   first and second illumination conduits each comprising a plurality of optical fibers arranged in a linear array and defining respective first and second transmission ends for locating adjacent to an interior portion of the casing for projecting an image of the light source onto the blade structure in the turbine, the projected image comprising an axially elongated projected image;
   a processor for processing reflected light images from a blade tip target portion corresponding to a blade passing event; and
   a detection conduit comprising a plurality of optical fibers arranged in a linear array and defining a receptor end, the detection conduit being configured to convey the reflected light images to the processor, and located adjacent to the transmission ends of the illumination conduits for receiving reflected light images from a plurality of locations along the axially elongated projected image during a blade passing event.

10. The blade vibration monitor as in claim 9, wherein the plurality of optical fibers defining each of the transmission ends of the illumination conduits and the receptor end of the detection conduit are bonded together and are each configured as a narrow rectangle, and the transmission ends and receptor end are joined together and are configured as a narrow rectangle to form a rectangular probe end defining a major probe axis parallel to the axially elongated projected image.

11. The blade vibration monitor as in claim 10, wherein the rectangular probe end is located relative to the blades such that the elongated projected image extends axially past a leading or trailing edge of the blades and the processor is effective to detect variations in light energy transmitted through the detection conduit and corresponding to a blade passing event comprising passage of either a leading edge or a trailing edge of a blade through the elongated projected image.

12. The blade vibration monitor as in claim 9, wherein the receptor end of the detection conduit is located sandwiched between the transmission ends of the illumination conduits.

13. The blade vibration monitor as in claim 12, including a cylindrical lens for focusing light from the transmission ends of the illumination conduits onto each blade tip target portion and for focusing reflected light from each blade tip target portion onto the receptor end of the detection conduit.

14. The blade vibration monitor as in claim 13, wherein a face of the cylindrical lens is bonded to the first and second transmission end of the illumination conduits and to the receptor end of the detection conduit.

15. In a turbine engine including a blade structure comprising a plurality of blades and blade tip target portions associated with the blades, and a casing surrounding the blade structure, a method of monitoring blade vibrations comprising:

emitting a line of light defining an axially elongated projected image from a plurality of illumination optical fibers;

passing the blade tip target portions along a path of travel through locations corresponding to the axially elongated projected image and forming reflected light images at locations on the blade tip target portions to define blade passing events; and receiving the reflected light images at a receptor end of a detection conduit defined by a plurality of receptor optical fibers, the reflected light corresponding to a plurality of locations along the axially elongated projected image as each blade tip target portion moves past the line of light.

16. The method as in claim 15, wherein the illumination optical fibers and receptor optical fibers are configured as narrow rectangular optical arrays located in side-by-side relation to each other.

17. The method as in claim 15, wherein the blade tip target portions are oriented transversely to a major axis of the axially elongated projected image, and movement of each blade tip target portion along the path of travel effects reflection of light from a continuously varying location along the elongated projected image.

18. The method as in claim 15, including conveying reflected light through the detection conduit to a processor and using the reflected light to identify a signal corresponding to the passage of either a leading edge or a trailing edge of a blade.

19. The method as in claim 18, including recording a time-of-arrival for each pass of a blade tip target portion, and using the time of arrival for multiple passes of the blade tip target portion to determine vibrational movement of the associated blade.

20. The method as in claim 15, wherein the axially elongated projected image extends past both a leading edge and a trailing edge of a blade and including recording a time-of-arrival for blade tip target portions at both the leading edge and the trailing edge, and using the difference between the times-of-arrival for the leading edge and the trailing edge to determine a torsional vibration mode for the blade.

* * * * *